United States Patent [19]

Hansen

[11] Patent Number: 5,324,138
[45] Date of Patent: Jun. 28, 1994

[54] IN SITU PROCESS FOR INCREASING THE CAPACITY OF A MUNICIPAL SOLID WASTE LANDFILL

[75] Inventor: David L. Hansen, Averill Park, N.Y.

[73] Assignee: Landfill Technologies, Inc., West Sand Lake, N.Y.

[21] Appl. No.: 525,458

[22] Filed: May 18, 1990

[51] Int. Cl.$^5$ .............................................. B09B 1/00
[52] U.S. Cl. .................................. 405/129; 405/131; 241/130
[58] Field of Search ............... 405/128, 129, 130, 131; 71/9, 901; 210/628, 510; 241/DIG. 38

[56] References Cited

U.S. PATENT DOCUMENTS

| | | | |
|---|---|---|---|
| 3,586,624 | 6/1971 | Larson | 405/129 |
| 3,614,867 | 10/1971 | Nieman | 405/271 X |
| 4,077,847 | 3/1978 | Choi et al. | 241/DIG. 38 X |
| 4,104,048 | 8/1978 | Urbanczyk | 71/9 |
| 4,410,142 | 10/1983 | Carlson | 241/30 X |
| 4,838,733 | 6/1989 | Katz | 405/129 |

FOREIGN PATENT DOCUMENTS 1415524  11/1975  United Kingdom ................. 405/131

OTHER PUBLICATIONS

Smith & Mahoney, P.C., The Greater Albany Sanitary Landfill Cap Repair Phase I Project Manual, p. i, pp. 105–117, Jun. 1989.

*Primary Examiner*—Randolph A. Reese
*Assistant Examiner*—J. Russell McBee
*Attorney, Agent, or Firm*—Heslin & Rothenberg

[57] ABSTRACT

The in situ process for increasing the capacity of a municipal solid waste landfill involves disturbing the municipal solid waste present within a landfill site, adjusting the moisture content of the waste material, adding a lime reagent, stockpiling the waste material and allowing the temperature to increase so that aerobic biostabilization is facilitated and allowing the temperature of the municipal solid waste material to decrease to a stable point. The process can be practiced with the use of currently available types of earth moving and refuse handling equipment and involves the addition of no other substances to the municipal solid waste except lime and water.

14 Claims, No Drawings

IN SITU PROCESS FOR INCREASING THE CAPACITY OF A MUNICIPAL SOLID WASTE LANDFILL

BACKGROUND OF THE INVENTION

The present invention relates generally to the field of garbage and refuse disposal. More particularly, it relates to increasing the capacity of currently existing landfills so as to allow these landfills to accommodate increased volumes of garbage, refuse, trash or other types of municipal solid waste without extending the physical limits of existing available landfills.

It has long been the practice to dispose of municipal solid waste and the like matter in landfills which are designed specifically for such a purpose. Presently, various municipalities have run across the problem of the lack of availability of suitable sites for Municipal Solid Waste landfills. Consequently, these municipalities have had to make do with their currently existing landfills. The problem is compounded with the fact that existing landfills have become overfilled or filled to near maximum capacity and a crisis situation has developed wherein there is presently a shortage of landfill space for the disposal of municipal solid waste.

In order to alleviate this problem, one approach would be to develop new landfill sites. Another approach is to maximize the usage of existing landfills by increasing their capacity. Presently, increasing the capacity of landfills has been conducted by compacting the municipal solid waste so as to increase the density of the solid waste within the landfill site. Such a technique is taught in Katz U.S. Pat. No. 4,838,733. However, the problem with this type of technique is that biostabilization of the existing municipal solid waste is not facilitated. In fact, compaction of the municipal solid waste by such a method impedes the biostabilization of the municipal solid waste because the more the waste is compacted, the less the probability that the waste will biostabilize. Therefore, compacting only increases the density of the municipal solid waste which is present within the landfill so the actual amount of solid waste material present within the landfill does not decrease.

The present invention provides a method by which the capacity of existing landfills can be increased dramatically through the biostabilization of the existing organic fraction of the municipal solid waste. The invention therefore actually reduces the amount of solid waste present within a landfill. It has been found that municipal solid waste excavated from lower substrate levels within existing landfills was not biostabilized. In fact, various organic material excavated from landfill sites are, remarkably, in almost their original non biodegraded state. The method according to the present invention creates a substantial increase in available airspace by converting this raw nonbiostabilized waste material to an inert state. Therefore, biostabilization of the organic portion of this municipal solid waste may be utilized to increase landfill capacity.

SUMMARY OF THE INVENTION

Presently, biostabilization of existing municipal solid waste within landfills has not been a practical solution to the problem of the shortage of new landfill locations and the shortage of space at existing landfills which are at their capacity. Part of the reason for this existing problem is that the existing municipal solid waste would have to be excavated and transferred to another location wherein biostabilization could be facilitated. Such a procedure would be extremely costly and time consuming.

Accordingly, it is an object of the present invention to increase the capacity of existing landfills by increasing the space available therein for additional municipal solid waste.

It is another object of this invention to facilitate the increase in landfill capacity through the utilization of currently available, and relatively economical, apparatus and machinery without the use of specialized equipment. This in situ biostabilization method can be implemented through the use of commonly available mobile earth moving and waste handling equipment.

It is also another object of the present invention to provide a relatively time efficient method of reducing the volume of a landfill so as to obtain a significant increase in landfill capacity within a relatively short period of time.

Another object of the present invention is to provide an in situ method of increasing the existing landfill volume such that municipal solid waste does not have to be transported outside the footprint of the existing landfill to another location for processing and biostabilization. Accordingly, there is no need to utilize manpower or equipment outside the existing landfill footprint area since the process may be entirely performed on the existing landfill site.

Another object of the present invention is to provide a method of increasing existing landfill capacity without contributing pollutant releases from buried raw solid waste. Such pollutants may create an environmental problem and their minimization is highly desirable. The present invention can be practiced without creating a situation where excess leachate is generated from the landfill.

The in situ process for increasing the capacity of a municipal solid waste landfill involves disturbing the municipal solid waste material so as to expose it to air, adjusting the moisture content of the solid waste material, and allowing the temperature of the solid waste material to increase so that the material biostabilizes aerobically. The process may also involve reaerating the solid waste material in order to prevent the waste from reaching a temperature where desirable bacteria are harmed, as well as screening the municipal solid waste to separate the soil-like material from the remaining solid waste material. When the municipal solid waste material has been biostabilized, the organic portion may be separated from the inert residual material.

The method for in situ biostabilization of municipal solid waste landfill contains several advantageous features. For example, the process can be executed with the use of commonly available machinery and equipment. Moreover, the process may be used on landfills with existing soil tops covering the municipal solid waste. If the landfill contains a soil top over the municipal solid waste, the soil can be removed through the use of a dragline, bulldozers, trackloaders and other typically known earth-moving equipment. This feature allows the implementation of such a method without the need for investing substantial resources in specialized equipment which would only have one practical purpose. In fact, since all that is needed is commercially available earth-moving equipment, nearly anyone involved in this type of industry may practice this particular process. As a result, this method is very economical and cost-efficient, and therefore is highly desirable.

Another desirable feature of the invention is that the process does not require the use or handling of chemical substances or compounds other than water and lime. There is no need for the costly import or export of hazardous waste or other expensive chemicals, materials and substances to the landfill site. Only water and lime are used as additional substances to be added to the municipal solid waste and no toxic materials or substances are used.

Another apparent feature of the invention is that the processes utilizes the implementation of controlled amounts of water so as to prevent or diminish leachate which may emulate from the landfill site. In conducting this process, it has generally been found that the municipal solid waste existing within the landfill site is too dry containing only about a 20% moisture content by weight. This results in the water supplied to the municipal solid waste being easily absorbed by the waste itself so the amount of leachate is relatively low. Moreover, the moisture content of the municipal solid waste can be easily monitored without the use of any equipment since it is readily apparent to the naked eye whether or not there is sufficient moisture.

Another major feature of the invention is that biostabilization of the municipal solid waste can be conducted to such a point that the end products of the in situ biostabilization process of the solid waste will be a stabilized humus-like (soil-like) material, which may have some reuse potential, and a residual (which will include mostly nonbiodegradable plastics and miscellaneous metals). The residual can be separated into various plastics and metals for reuse or recycling purposes.

The entire process provides a novel method for increasing the space available for waste within in an existing landfill such that the capacity of the landfill can increase dramatically. It can be accomplished within the existing landfill site without the use of specialized equipment, materials or substances. Although the capacity of existing landfills may be increased by an amount of 30 to 60 percent, the amount of increase in capacity will vary based upon the amount of biodegradation which has occurred at a particular landfill.

DETAILED DESCRIPTION OF THE PREFERRED EMBODIMENT

Portions of landfills which are completely filled or near capacity may often contain a cover layer of soil over the municipal solid waste. The cover helps contain the municipal solid waste, reduce water infiltration, reduces any odors, and creates a more aesthetically attractive landfill. If the landfill contains a soil cover, increasing the volume of the existing landfill in accordance with the present invention often requires that the soil cover be removed such that the municipal solid waste thereunder is accessible. Different methods and apparatus may be used to remove the soil cover. For example, a conventional dragline may be used to remove the cover soil. Also, it is anticipated that other types of machinery such as bulldozers, backhoes, trackloaders and other types of earth-moving equipment may also be satisfactory for this particular purpose. Although the aforementioned list of machinery is limited, any apparatus or technique for removing the cover soil from the top of the municipal solid waste can be utilized.

After the soil cover has been removed from the top of the municipal solid waste (assuming this was necessary), the soil concentration of the municipal solid waste within the landfill should be examined to determine if there is excess soil present within the municipal solid waste material. The process according to the present invention may be more efficiently practiced by removing the excess soil fraction of the municipal solid waste. Typically, if large quantities of soil are visibly apparent it may be desirable to separate the soil portion. A convenient method for removing the soil fraction is to screen the raw material to separate the soil fraction from the remaining solid waste material which is to be biostabilized. Note, however, that it is not necessary to perform this initial screening and to separate the soil fraction. Nevertheless, the process may be more efficiently performed, depending upon the amount of initial soil content, by removing some of the soil fraction.

Screening of the soil fraction of the raw solid waste material may be accomplished through the use of a trommel (rotating cylindrical screen). Trommels having a half inch screen mesh opening have been used to sufficiently separate the soil fraction from the raw municipal solid waste. By placing the raw solid waste on top of the rotating screen, the vibration caused by the screen rotation causes the soil fraction of the municipal solid waste to fall through the screen mesh, while the non-soil solid waste remains on top of the screens.

Screening may also be performed in the same manner as the trommel with the use of an EXTEC commercial vibrating deck screen having a two inch mesh screen plate. However, various other mesh sizes for either screening technique may be used depending upon the hardness and moisture content of the soil fraction. The soil fraction which passes through the mesh screening can be recovered and reused as a soil cover for the biostabilized municipal solid waste resulting at the end of the entire inventive process. Notwithstanding whether an initial screening has been performed, the municipal solid waste material within the landfill must be disturbed, in order to create an environment where biostabilization may be achieved. The municipal solid waste material is disturbed by excavating, agitating, shearing, grinding, mixing and/or deranging the material to the point where the entire amount of the municipal solid waste has been exposed to air so that it may aerobically biostabilize. The greater the amount of exposure to air the higher the propensity for the organic fraction of the municipal solid waste to biostabilize.

There are several methods available for disturbing the municipal solid waste. For example, the waste may be sufficiently disturbed through the use of bulldozers to push the material in a criss-cross type of pattern thereby shearing and grinding larger masses of waste into smaller particles and tearing open plastic or paper bags and boxes to expose the contents therein to air. The bulldozers provide an efficient way of disturbing the municipal solid waste so that it is exposed to air. The push blade button edge travels across masses of raw municipal solid waste creating a shearing effect. A grinding effect is created by the track cleats contacting the raw material. By operating the bulldozers in a zigzag, turning and/or twisting motion, and transversing the municipal solid waste underneath the bulldozer in alternate directions, the municipal solid waste is ground to a sufficient degree such that the size of the municipal solid waste components have been sufficiently reduced. This technique can be performed until such a time as it becomes visibly apparent that substantially all of the solid waste to be biostabilized has been exposed to air, ground and reduced in size.

It is important to note that the disturbing of the municipal solid waste is performed for the purpose of exposing the entire organic portion of the municipal solid waste to air so as to facilitate aerobic biostabilization. Therefore, the grinding of the municipal solid waste into a specific particle size is not necessary. However, the aerobic biostabilization process will be obtained more efficiently if the municipal solid waste is completely exposed to air. The disturbance of the municipal solid waste should be performed until such a time when the entire portion of the organic solid waste has been exposed to air.

More sophisticated types of grinding equipment other than bulldozers may, of course, be used. For example, a horizontal shaft slow speed shredder or other type of mobile shredding unit capable of handling municipal solid waste may prove to be more efficient for the purpose of disturbing the municipal solid waste. Any combination of apparatus or machinery which will operate to disturb the waste material such that the organic portion thereof is completely exposed to air will suffice for use in the inventive process. Therefore, the invention is not intended to be limited to the use of any type of particular equipment or machinery.

The disturbed municipal solid waste must be moisture adjusted. This may occur simultaneously with the grinding disturbing and agitating of the municipal solid waste. However, moisture adjusting can also occur after disturbing the municipal solid waste material. The waste must be moisture adjusted to such a degree that the moisture content of the municipal solid waste sufficiently promotes aerobic biostabilization. It has been found that biostabilization can be most efficiently achieved when the moisture content of the municipal solid waste is 40 to 60 percent by weight. A moisture content which is too low will tend to impede the biostabilization process such that the amount of time it will take for the municipal solid waste to completely biostabilize will take longer when compared to the time that it would take for municipal solid waste which has a proper moisture content to biostabilize. Conversely, when the municipal solid waste has been over moisturized, there may be a tendency for the municipal solid waste to generate a leachate. Such leachate is highly undesirable because of the tendency for the leachate to absorb its way into ground water and other areas of concern. In practicality, the moisture content of the municipal solid waste can be adjusted in such a manner that it is visible whether or not there is a sufficient amount of moisture within the municipal solid waste. For instance, municipal solid waste which is overmoisturized will tend to be oversaturated to such an extent that there will be visible areas of liquid or some puddles within the municipal solid waste. Also, it will be visibly apparent if the waste is too dry. A visible inspection of the municipal solid waste will easily indicate whether portions of the waste are too dry, such that water must be added, or too wet, such that dry municipal solid waste should be mixed into the oversaturated municipal solid waste. Moisture adjustment should be performed until such time as there are no visible amounts of excess water or dry areas of waste.

Moisture adjustment may be effectively performed with the use of agricultural-type spray irrigation units. Some of these types of units have been known to apply approximately 500 gallons per minute of water to a pre-selected work area. The amount of water which may have been applied to the waste may be easily calculated by calculating the appropriate weight of the dry waste through density and volume values) and applying a corresponding amount of water to yield a moisture content of 40-60% by weight.

However, other more sophisticated types of moisture adjustment methods may also be utilized. For example, water may also be added at the same time that the municipal solid waste is being processed by a shredding unit, if a shredding unit is being used. This type of technique could also add dry municipal solid waste to waste which is overly moisturized. Moreover, moisture adjustment can be performed by overmoisturizing new municipal solid waste and mixing this new waste material with the disturbed municipal solid waste material. Depending upon the size, configuration and depth of a landfill, such a method of moisture adjustment may be preferred over a typical agricultural spray irrigation units. Also, it is anticipated that field soaking techniques such as the placement of perforated pipes within municipal solid waste that has been sufficiently agitated may also be utilized.

Moreover, moisture content may be increased through the use of other types of liquids and not strictly water. For example, excess leachate which has been discovered, sewage sludge or other high-water content sludges may also be mixed with excessive dry portions of the municipal solid waste so as to properly adjust the moisture content. Typically, in most landfills, the municipal solid waste subgrade material is almost uniformly too dry for biostabilization. Therefore, typically when this material is disturbed, it will be discovered that little or no biostabilization has taken place and that the municipal solid waste material at such lower subgrade level is extremely dry. Moreover, the typical temperature of the municipal solid waste prior to disturbance and moisture adjustment is about 60° to 70° F. These relatively low temperatures indicate that the municipal solid waste is not rapidly biostabilizing.

In an unlined landfill, it is important that the quantity of moisture added not be excessive, in order to minimize the possibility of leachate generation. Test pits may be excavated within the municipal solid waste in order to indicate whether or not the municipal solid waste is further absorbing any water. If a particular landfill is unlined, these test pits may be desired to help prevent any potential leachate generation and to insure that it does not seep outside the landfill area. After the waste material has been agitated, disturbed and ground so that it has been sized reduced and adjusted for proper moisture content, the municipal solid waste material should be allowed to biostabilize.

In many cases, it may be necessary and desirable to add a lime reagent (hydrated lime, quick lime, lime kiln dust, or a high CaO content cement kiln dust) to the mass of waste in order to reduce odors and neutralize and buffer the Ph, which is typically acidic, in the untreated municipal solid waste. The quantity required will vary depending upon initial Ph and odor conditions. The addition of lime is accomplished with agricultural lime application equipment, or may be mixed with a liquid reagent prior to moisture adjustment.

After the municipal solid waste has been properly size reduced, moisture adjusted, and limed (if necessary) the waste material should be stockpiled, preferably in a uniform layer, within the existing landfill area. The optimum depth of this layer should be approximately 6 to 8 feet. However, it has been found that municipal solid waste material may be organized in piles as high as 30 feet, or in layers as low as 4 feet. Also, it is possible that lower layers or higher piles may also allow for biostabilization.

During this phase, the temperature of the substrate levels of the municipal solid waste may be monitored continuously. The municipal solid waste material will generate heat as a result of its biostabilization. The substrate temperatures at this point during the process should reach approximately 120° to 140° F. and normally remain at such a level for at least a period of several weeks. It is possible, however, that the substrate temperatures of the municipal solid waste material may increase above 140° F. If such an increase in temperature occurs, the material must be reaerated to reduce the temperature of the mass in order to maintain proper conditions where the municipal solid waste reacts to the desired bacterial group. At such high temperatures, undesirable high temperature range bacteria begin to flourish while the desirable low to mid range bacterial groups are harmed. Also, the municipal solid waste material may again be moisture adjusted if it is apparent that the moisture level at this point is insufficient. When the waste material has been reaerated, the temperature will tend to fall back down to the 120° to 140° F. range.

Reaeration can be accomplished by redisturbing the material using the same means as originally used to disturb the material. For instance, bulldozers, excavators, and grinding equipment, such as horizontal shaft slow-speed shear shredders, as well as other waste shredding equipment may also be used. It may also be possible to include the placement of perforated pipes within the piles or layers of municipal solid waste material as a means for directing forced air into the municipal solid waste so as to reaerate without the need for disturbing or regrinding this material. It is important to note, that even after the temperature has been brought down from 140° F. to the 120°-140° F. range, the substrate temperature may again rise above 140° F. Also the oxygen within the waste material may be depleted resulting in the onset of undesirable anaerobic conditions. When these conditions occur, the municipal solid waste material may have to be reaerated and/or moisture adjusted so that aeration and/or moisture adjustment may occur more than once during the biostabilization cycle. In fact, it would not be uncommon for the municipal solid waste material to be reaerated two or three times thereby creating a biostabilization cycle time of approximately six months or longer.

The major portion of the biostabilization will have taken place when the substrate temperature of the municipal solid waste decreases from the level of 120° to 140° F. to temperatures of approximately 70° to 80° F. When this lower temperature range is reached, the major portion of the biostabilization process has been achieved and most of the organic waste will be converted into a brown, humus-like material. The inorganic waste such as the various plastics and rubbers will remain in the waste material and, if it has not been previously screened and separated, will be mixed with the humus-like material.

At this point of the process, biostabilization has taken place and the volume of the municipal solid waste will have been significantly reduced. Therefore, the landfill will be capable of accepting substantially more raw municipal solid waste. Accordingly, after biostabilization has taken place, additional municipal solid waste can be placed or layered on top of the biostabilized municipal solid waste.

However, since the final products of biostabilization are essentially the organic brown, humus-like soil material and the inert inorganic plastic-type fraction, it may be desirable to remove the biostabilized organic fraction from the inert waste material. This can be accomplished by performing an additional screening step which will remove the stabilized humus-like fraction from the remaining inert municipal solid waste material. The screening at this stage of the invention can be accomplished following the same techniques as taught for the earlier initial screening process at the beginning of the entire process. At this screening stage, the mesh size of the mobile vibrating deck screen or rotating screen should depend upon the moisture content of the municipal solid waste product as well as the desired consistency of the brown, humus-like soil product. It has been found that mesh sizes ranging from one to three inches may be appropriate at this stage of the invention. Please note, however, that other types of screening machinery or techniques could also be employed to achieve the same result of separating the brown, humus-like material from the plastic inert residual material. For example, large commercial mobile trommels or customized vibrating screen units could be designed specifically for this task.

At this point, the inert residual material may contain various different types of recyclable materials. Therefore, the inert residual material could be hand or machine picked to recover any recyclable metals, plastics or other types of materials. This can occur by either hand picking or by utilizing a conveyor belt type of apparatus. Any non-recyclable inert residual material which has not been separated for recycling can be placed in a compacted layer within the landfill site. This material should form the lowest level of the landfill site and may be compacted so as to take up a minimum volume within the landfill. The compaction could be achieved by using any landfill compaction machines or by possibly baling the material into a highly dense form and placing the baled material within the landfill site. Also, the brown soil-like humus material may be used to cover this material within the landfill. Moreover, there may be some commercial need for this type of material.

However, notwithstanding the future uses of this brown humus-like soil material. The essential purpose of the present invention has been achieved and the volume of the existing landfill will have been significantly decreased. While an in situ process for increasing the capacity of a municipal solid waste landfill through biostabilization of the municipal solid waste has been described by a preferred method, it is not intended to be limited to the details provided herein since various modifications and changes may be made without departing, in any way, from the spirit of the present invention. For example, there are various techniques which may be used to screen the municipal solid waste, disturb the municipal solid waste and aerate the municipal solid waste, etc.

Many variations and different techniques which may be utilized to perform the process are intended to be within the scope of the present invention as defined and set forth in the appended claims.

I claim:

1. An in situ process for increasing the capacity of a municipal solid waste landfill comprising:

disturbing previously landfilled municipal solid waste buried within a landfill;

aerating the disturbed municipal solid waste;

adjusting the moisture content of the municipal solid waste material;

stockpiling the municipal solid waste and allowing the temperature of the municipal solid waste material to increase to a degree wherein biostabilization of the municipal solid waste is facilitated; and allowing the temperature of the municipal solid waste material to decrease to a stable point indicative that the municipal solid waste material has substantially biostabilized.

2. The in situ process for increasing the capacity of a municipal solid waste landfill according to claim 1 further comprising adding a lime reagent to the municipal solid waste material.

3. The in situ process for increasing the capacity of a municipal solid waste landfill according to claim 2 wherein the moisture content of the municipal solid waste material is adjusted to be 40 to 60% by weight.

4. The in situ process for increasing the capacity of a municipal solid waste landfill according to claim 2 wherein the municipal solid waste material is reaerated when the temperature of the solid waste reaches approximately 140° F.

5. The in situ process for increasing the capacity of a municipal solid waste landfill according to claim 1 further comprising reaerating the municipal solid waste material.

6. The in situ process for increasing the capacity of a municipal solid waste landfill according to claim 5 wherein the municipal solid waste material is initially screened to separate the soil fraction of the municipal solid waste material from the remaining fraction of the municipal solid waste material.

7. The in situ process for increasing the capacity of a municipal solid waste landfill according to claim 5 further comprising separating the biostabilized organic portion of the municipal solid waste material from the inert residual material.

8. The in situ process for increasing the capacity of a municipal solid waste landfill according to claim 5 further comprising removing at least the portion of an existing soil cover of the landfill.

9. The in situ process for increasing the capacity of a municipal solid waste landfill according to claim 5 further comprising allowing the temperatures of the municipal solid waste material to decrease to a stable point indicative that the municipal solid waste material has substantially biostabilized after the municipal solid waste material has been reaerated.

10. The in situ process for increasing the capacity of a municipal solid waste landfill according to claim 1 wherein the solid waste material is allowed to aerobically biostabilize by allowing the temperature of the municipal solid waste material to increase to over 120° F.

11. The in situ process for increasing the capacity of a municipal solid waste landfill according to claim 1 wherein the moisture content of a municipal solid waste material is adjusted more than once.

12. An in situ process for increasing the capacity of a municipal solid waste landfill according to claim 11 further comprising filling the existing landfill site with the residual material.

13. An in situ process for increasing the capacity of a municipal solid waste landfill according to claim 11 wherein recyclable materials are separated from the inert residual material.

14. A process for reducing the volume of a pre-existing landfill formed initially by placing decomposable landfill materials at a landfill site and covering said landfill materials with a suitable earth cover, thereafter removing the cover from the landfill materials, mixing the decomposable landfill materials at the landfill site, aerating the decomposable landfill materials at the landfill site, and moistening the decomposable landfill materials at the landfill site, said aerating step occurring on a periodic basis thereby inducing and accelerating the decomposition of the decomposable landfill materials whereby the volume of decomposable landfill materials is reduced.

* * * * *